US006451228B1

(12) United States Patent
Hinzpeter et al.

(10) Patent No.: US 6,451,228 B1
(45) Date of Patent: Sep. 17, 2002

(54) ADJUSTING METHOD FOR A ROTARY TABLET PRESS WITH AN ANGLE PULSE ENCODER FOR EVALUATING THE PRESSING FORCE COURSE AT THE INDIVIDUAL PUNCHES IN AT LEAST ONE PRESSING STATION

(75) Inventors: Jürgen Hinzpeter; Ingo Schmidt, both of Schwarzenbek; Ulrich Gathmann; Jörg Reitberger, both of Hamburg; Joachim Greve, Pogeez; Klaus-Peter Preuss, Mölln, all of (DE)

(73) Assignee: Wilhelm Fette GmbH, Schwarzenbek (DE)

( * ) Notice: Subject to any disclaimer, the term of this patent is extended or adjusted under 35 U.S.C. 154(b) by 0 days.

(21) Appl. No.: 09/520,650

(22) Filed: Mar. 7, 2000

(30) Foreign Application Priority Data

Mar. 13, 1999 (DE) ........................................ 199 11 294

(51) Int. Cl.[7] ................................................ B29C 43/08

(52) U.S. Cl. ....................... 264/40.1; 264/109; 425/150

(58) Field of Search ................................ 264/40.1, 109; 425/150

(56) References Cited

U.S. PATENT DOCUMENTS 5,145,693 A 9/1992 Hinzpeter et al. .......... 425/149
5,223,192 A * 6/1993 Hinzpeter et al. .......... 264/109
5,699,273 A * 12/1997 Hinzpeter et al. .......... 700/148

* cited by examiner

*Primary Examiner*—Mary Lynn Theisen

(74) *Attorney, Agent, or Firm*—Faegre & Benson, LLP

(57) ABSTRACT

An adjusting method for a rotary tablet press with an angle pulse encoder for evaluating the pressing force course at the individual punches in at least one pressing station, in which the angle pulse encoder per revolution of the press rotor produces a pulse per revolution and per rotational angle value produces an angle pulse, characterised by the following steps:

the angle pulse encoder is rigidly assembled relative to the rotor shaft in any position the rotor with a predetermined punch is moved visually under the middle of a main pressing roller (coarse position)

the rotor is rotated until the pulse per revolution appears, and the angle pulses until the pulse per revolution are counted by a machine computer and their number is stored the computer computes the coarse positions of all punches, expressed in angle pulses, in relation to the pulse per revolution and produces on rotation of the rotor one coarse position pulse per punch in the computer to each coarse position there is allocated a measuring window extending on both sides of the coarse position in operation of the tablet press at each angle pulse in the measuring window or over the whole coarse of the signal per punch the pressing force course is scanned the computer evaluates the real punch positions at the pressing force maxima or minima and determines the deviation (k) of the real positions from the coarse positions the computer evaluates from the individual deviations a correction factor for determining the fine position of the punches.

3 Claims, 3 Drawing Sheets

ADJUSTING METHOD FOR A ROTARY TABLET PRESS WITH AN ANGLE PULSE ENCODER FOR EVALUATING THE PRESSING FORCE COURSE AT THE INDIVIDUAL PUNCHES IN AT LEAST ONE PRESSING STATION

BACKGROUND OF THE INVENTION

The invention relates to an adjusting method for a rotary tablet press with a angle pulse encoder for evaluating the pressing force course on the individual punches in at least one pressing station, according to the introductory part of claim 1.

From EP 0 431 269 it is known, with rotary tablet presses to measure the maxima of each individual pressing with respect to the punch number and to compute for example the mean or the relative standard deviation. From the measuring results individual sortings-out and pressing force controls may be carried out.

From the mentioned document it is known, below the gear for the drive of the die plates to flange on a pulse encoder (angle encoder) which for example produces 3600 individual pulses per revolution. Furthermore per rotor revolution a rotation pulse is produced. With this an individual pulse corresponds to 0.1° rotational angle of the rotor. The pulse encoder signals are supplied to a machine computer. With the help of the inputted punch number of the rotor this computer computes the number of angle pulses for the punch separation. Furthermore for each punch it computes a punch pulse with which a pressing force evaluation is carried out. The horizontal position of each punch during the compression phase is as a result known. The same applies to the pre-pressing station, which as is known is arranged at a fixed angle (pulse distance) to a main pressing station. Furthermore it is known, with a rotating rotor during the compression phase within a measuring window or over the whole signal course in the cycle of the angle pulses, for the analog pressing force signal to be measured and subjected to a maximum determination. The width of the measuring window corresponds as a rule to half the number of the angle pulses of a punch separation. The digitalised maximum value of the pressing force course is allocated to the associated punch number or the corresponding pressing station.

The scanning of the pressing force analog signal within a measuring window has the advantage that there is available a time reserve for further computations between the individual punches and that phase shiftings of the analog pressing force signal, which for example occur by a change in the speed or the pressing force, do not lead to measuring errors with the evaluation of the maximum.

The described method requires the exact adjustment of the angle pulse encoder relative to the rotor. The accuracy should be at least 0.1° and is dependent of the fine touch of the person doing the adjusting. The angle pulse encoder is normally difficultly accessible and additional auxiliary means are required for the manual adjusting method, such as measuring punch, oscilloscope or likewise. Such an adjustment must be carried out during the end assembly or also later with a change of the angle pulse encoder. Such an adjusting method proceeds as follows:

A measuring punch is installed in the punch station for example No. 1 and is rotated visually as exact as possible below the middle of the main pressing station. The measuring punch is centered under pressing force. By hand the angle pulse encoder is rotated such that with this rotor position the pulse per revolution appears. Subsequently the screws for fastening the angle pulse encoder are carefully tightened in order not to lose the adjustment. With a rotating rotor the punch pulse is controlled for centricity to the pressing force with an oscilloscope. Subsequently there is effected a possible readjustment.

BRIEF SUMMARY OF THE INVENTION

It is the object of the invention to specify a method with which a pressing force evaluation may be effected without a manual adjustment of the angle pulse encoder.

Expensive manual adjustment work is to be done away with and also the application of auxiliary means. On the other hand a high precision is to be achieved.

This object is achieved by the features of patent claim 1.

With the method according to the invention the angle pulse encoder is rigidly mounted in any position relative to the rotor shaft. Subsequently with the rotor the punch no. 1 is moved under the middle of a main pressing roller (the main pressing station). The movement may be effected by hand or with a crawling operation by a motor drive. It is essential that the punch is located approximately centrally below the main pressing roller, wherein a deviation may be +/−a quarter of the punch separation. With this the assembly of the remaining punches is not yet necessary. Alternatively already all punches may be assembled.

Subsequently the rotor by way of a command input at the operating computer is set in rotation, for example in crawling operation, until the pulse per revolution is produced. The number of pulses which are produced by this rotation up to the pulse per revolution are counted, and their number is stored in a machine computer (pulse offset). The machine computer computes the coarse positions, expressed in angle pulses, of all punches in relation to the pulse per revolution and produces on rotation of the rotor one coarse position pulse per punch. In the computer to each coarse position there is allocated a measuring window which extends to both sides of the coarse position. The allocation of a measuring window is, as already explained above, known per se.

From now the tablet press is set into operation, i.e. the punches must be installed and the material is supplied. From now, as is also known per se, in the measuring window or over the whole signal coarse per punch the pressing force course is scanned. As a result an angle-pulse-dependent pressing force coarse is obtained. The pressing force course by nature has a maximum and two minima. The punches are then located exactly below the middle of the main pressing roller when the pressing force maximum is produced or the two pressing force minima lie synmmetrically, i.e. the same angle pulse number, to the pressing roller middle. For determining the symmetry also the measuring points of the pressing force signal which lie above the minima are also suitable as long as both courses of the flanks behave equally. From the course of the pressing force as a result the computer thus evaluates the real punch position. This position as a rule does not correspond to the coarse position, but deviates from this by a distance of one or more angle pulses. The computer determines the deviations from the real and coarse position and evaluates from the individual deviations, which may indeed be different for the individual punches, a correction factor for determining the fine position of the punch. In other words the position pulse for the individual punches which previously had been determined from the coarse position, is from now on corrected by the correction factor.

If previously one has always spoken of one punch, then it is to be understood that with a tablet press usually in each case there are provided punch pairs, which together are arranged above and below a die plate and cooperate with a die opening.

For finding out a unambiguous correction factor the pressing force courses of all present punches may be taken into account and their frequency underlying this. If with this an unambiguous value stands out then it is used for the fine adjustment.

With a change of the rotor with another punch number the adjustment of the angle pulse encoder is not necessary. The evaluated angle pulse number, i.e. the result from the pulse offset and correction factor, may be stored in a computer. An adjustment is therefore only necessary with new machines or with the exchange of the angle pulse encoder.

BRIEF DESCRIPTION OF THE DRAWINGS

The invention is hereinafter described in more detail by way of an embodiment example.

DETAILED DESCRIPTION OF THE INVENTION

Figure 1:
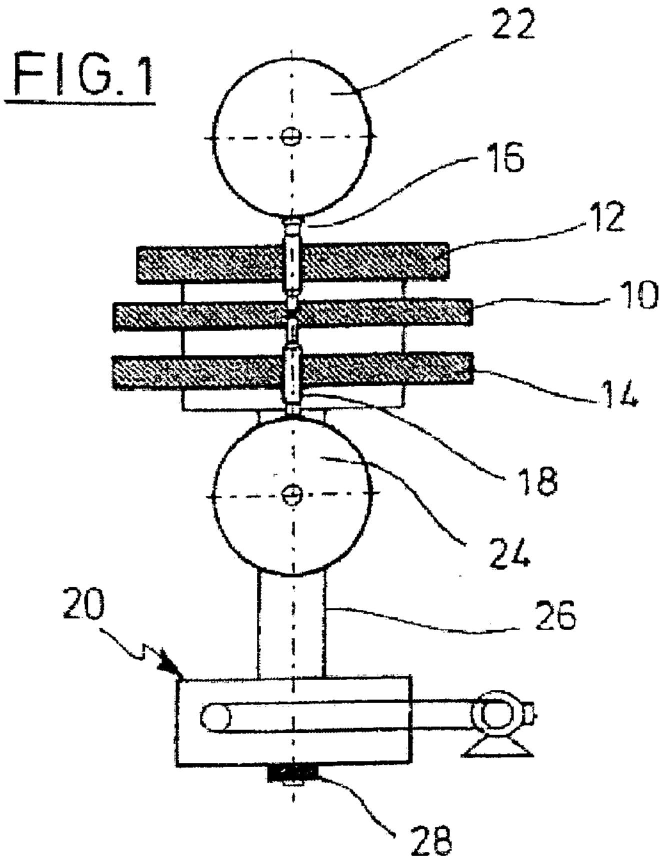
FIG. 1 shows schematically a lateral view of a rotary tablet press.

A tablet press consists as usual of a die plate with die holes, punch holding plates 12, 14 below and above the die plate 10, which hold the upper punch 16 and lower punch 18 respectively in an axially movable manner for the purpose of cooperation with the die holes. The plates 10 to 14 form a rotor, which is driven by a motor 21 and gear 20.

Figure 2:
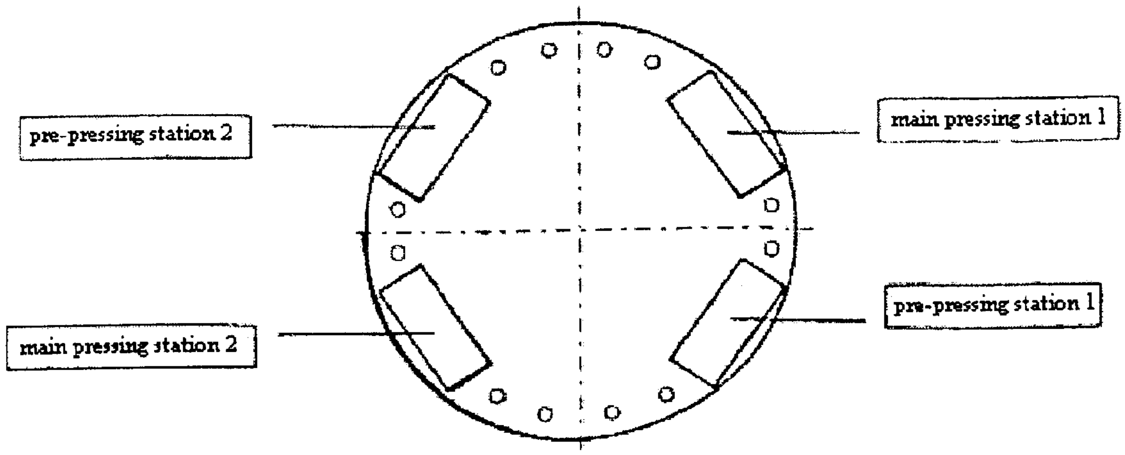
FIG. 2 shows a plan view of the tablet press according to FIG. 1.

With this the individual punches move through corresponding pressing stations. In FIG. 2 there are indicated two main pressing stations and two pre-pressing stations. In the pressure stations there are located pressing rollers, of which in FIG. 1 which for example shows a main pressing station, there are provided an upper pressing roller 22 and a lower pressing roller 24.

Figure 5:
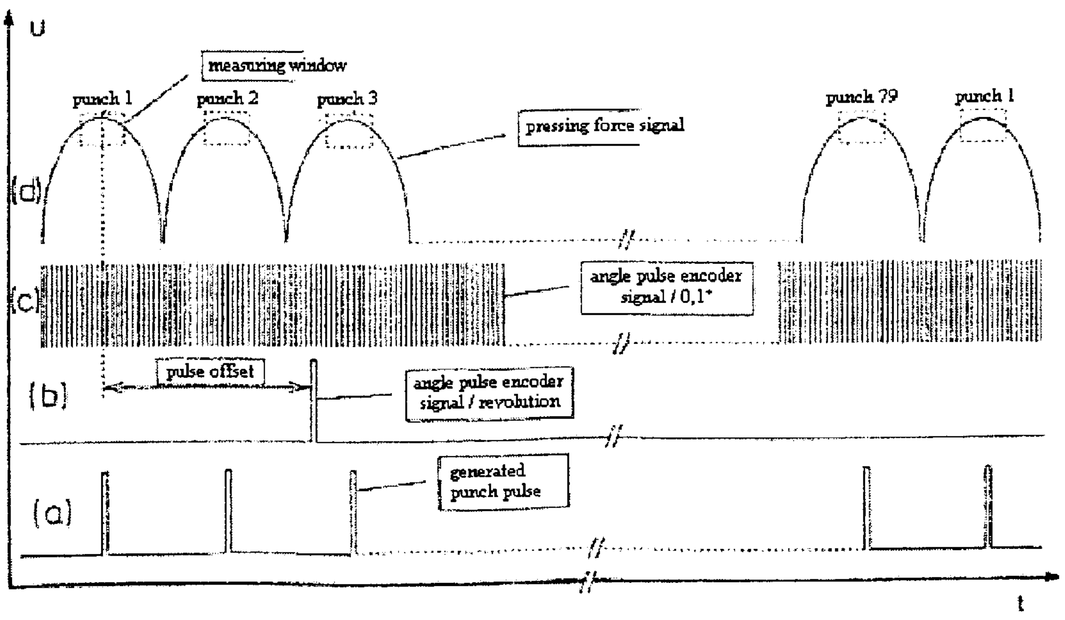
FIG. 5 shows a diagram for the allocation of all signals with an adjusting method according to the invention.

On a shaft 26 for the described rotor there is seated an angle pulse encoder 28 or angle encoder. The angle encoder produces with a rotation of the shaft 26 angle pulses as are indicated in FIG. 5*c*. Per 0.1° rotation there is produced one pulse.

Figure 3:
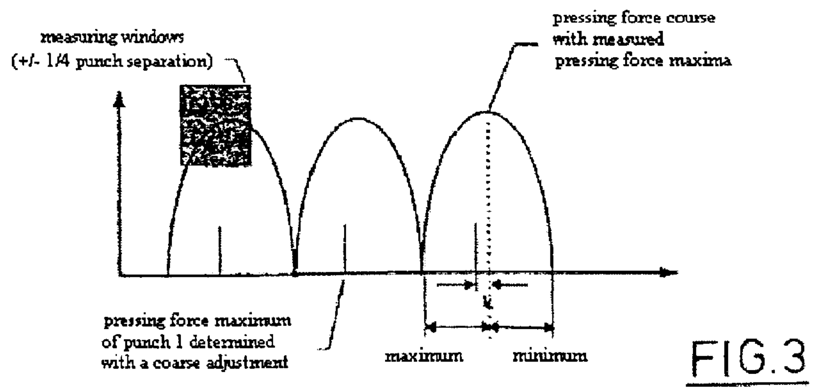
FIG. 3 shows schematically the pressing force course for the punch pulse after the coarse adjustment.
Figure 4:
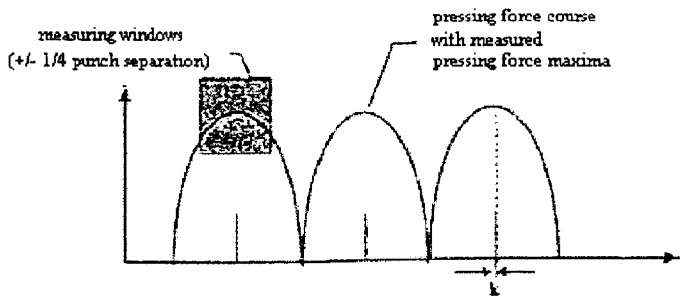
FIG. 4 shows a similar representation as FIG. 3, but after the fine adjustment.

In the FIGS. 3 and 4 the course of the pressing force for the individual punches over time are plotted. The pressing force course is measured with the usual methods, as are roughly described in the previously mentioned document or DE 195 02 596. The punch position relative to the pressing stations is characterised by the pulse number. Since however without a further feature a rigid allocation is not possible, the angle pulse encoder produces a so-called pulse per revolution, i.e. one pulse per revolution. If the angle pulse encoder is assembled at any position relative to the rotor, the relationship of the pulse per revolution relative to the punches is first undetermined. If roughly the punch 1 is approximately aligned with respect to a pressing roller of a main station and for this in the computer a measuring window is made available, there roughly results the arrangement of a measuring window according to FIG. 3, i.e. it is slightly displaced relative to the true maximum or to the exact middle setting. The pulse offset, i.e. the pulse distance of the pulse per revolution from the firstly manually or visually adjusted coarse position of the punch 1 to the middle of the pressing roller is not directed to the true middle, but to the coarsely set one. The accordingly generatable position pulses for the punches do not therefore correspond to the true alignment. These generated pulses are represented in FIG. 5*a*. In FIG. 3 with respect to the true pressing force maximum they have a deviation k.

If in the meantime the punch positions are deduced in that the pressing force curve in the measuring window is evaluated and subsequently the maximum is determined, which is effected in normal operation of the press, the real position of each punch is fixed in which it is aligned exactly to the middle of the pressing roller. The deviation with respect to the coarse position is, as mentioned, k. If a correction of the coarse position pulses is effected by the correction factor, there results an allocation as is shown in FIG. 4, i.e. the position pulses of the punches lie at the maximum of the pressing force. The measuring window is therefore correspondingly displaced.

Figure 6:
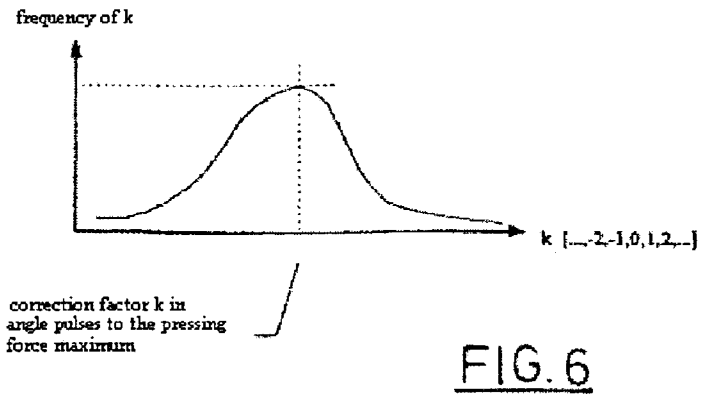
FIG. 6 shows a diagram for evaluating the correction factor.

In FIG. 6 the frequency of the deviations k in angle pulses is drawn up over the angle pulses. It is conceivable to evaluate a correction factor for each individual punch, since the deviation per punch position has been evaluated. It is however also possible to evaluate a mean correction factor and thus to correct the coarse position of all punches.

Figure 7:
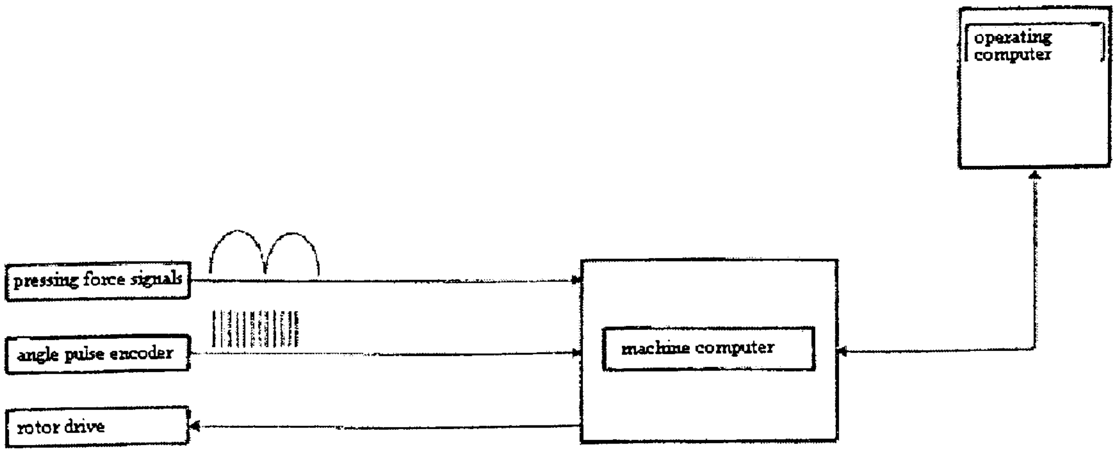
FIG. 7 shows a block diagram for the arrangement for carrying out the method according to the invention.

In FIG. 7 it is shown simplified which signals are inputted to the machine computer. They are the signals from the angle pulse encoder (angle pulses and pulse per revolution) as well as the pressing force signals from the device for evaluating the pressing force coarse of the individual punches. The machine computer controls the drive of the rotor and for its part is controlled by the operating computer of the whole press.

What is claimed is:

1. A method for a rotary tablet press with an angle pulse encoder for evaluating the pressing force course at a plurality of individual punches in at least one pressing station, in which the angle pulse encoder per revolution of the press rotor produces a pulse per revolution and a per rotational angle value produces an angle pulse, characterized by the following steps:

rigidly assembling the angle pulse encoder relative to the rotor shaft visually moving the rotor until a predetermined punch is under the middle of a main pressing roller to provide a coarse position rotating the rotor until the pulse per revolution appears, and using a computer to count and store the angle pulses until the pulse per revolution appears computing the coarse positions of all punches, expressed in angle pulses, in relation to the pulse per revolution and producing one coarse position pulse per punch on rotation of the rotor allocating a measuring window extending on both sides of the coarse position for each coarse position scanning the pressing force course at each angle pulse in the measuring window or over the whole course of the signal per punch during operation of the tablet press using the computer to evaluate the real punch positions at the pressing force maxima or minima and determining the deviation (k) of the real positions from the coarse positions using the computer to evaluate a correction factor for determining the fine position of the punches from the individual deviations.

2. A method according to claim 1, wherein the computer evaluates a frequency distribution and determines the correction factor from the frequency distribution from the deviations of all punch coarse positions from the real punch positions.

3. A method for determining the exact position of a plurality of individual punches in a rotary tablet press which comprises a rotor with a plurality of die bores, the punches being associated with respective die bores and rotate in conjunction with the rotor, at least one pressing station where the punches are actuated by a main pressing roller, an angle pulse encoder coupled to the shaft of the rotor which produces one pulse per revolution of the rotor defining a reference and produces an angle pulse per rotational angle value of the rotor, pressure sensing means associated with the main pressing roller to measure the pressure on the individual punches passing the pressing roller and generating individual pressure signals, and a machine computer, characterized by the following steps:

rigidly assembling the angle pulse encoder relative to the rotary shaft rotating the rotor until a predetermined punch is visually positioned under the center of the main pressing roller at an approximate position rotating the rotor until the pulse per revolution is generated by the encoder and counting and storing the angle pulses produced during rotation of the rotor until the generation of the pulse per revolution using the machine computer using the computer to compute the approximate positions of all other punches, expressed by angle pulses, in relation to the generated pulse per revolution and producing on rotation an approximate position pulse per punch allocating measuring windows in the computer extending on both sides of the approximate punch positions expressed in angle pulses scanning a pressing force on the punches using the pressure sensing means for each measuring window or the whole course of the pressure signal per punch determining the real punch position using the computer by detecting the maxima or minima of the pressure signals and determining the deviation (k) of the real positions from the approximate punch positions and evaluating a correction factor for determining the exact position of the punches from the individual deviations (k).

* * * * *